July 7, 1925.  
T. A. JENKINS  
1,545,143  
AUTOMATIC MILK RECEIVER  
Filed July 6, 1921  
5 Sheets-Sheet 1

INVENTOR  
THOMAS A. JENKINS  
BY Fetherstonhaugh & Co.  
ATTORNEY

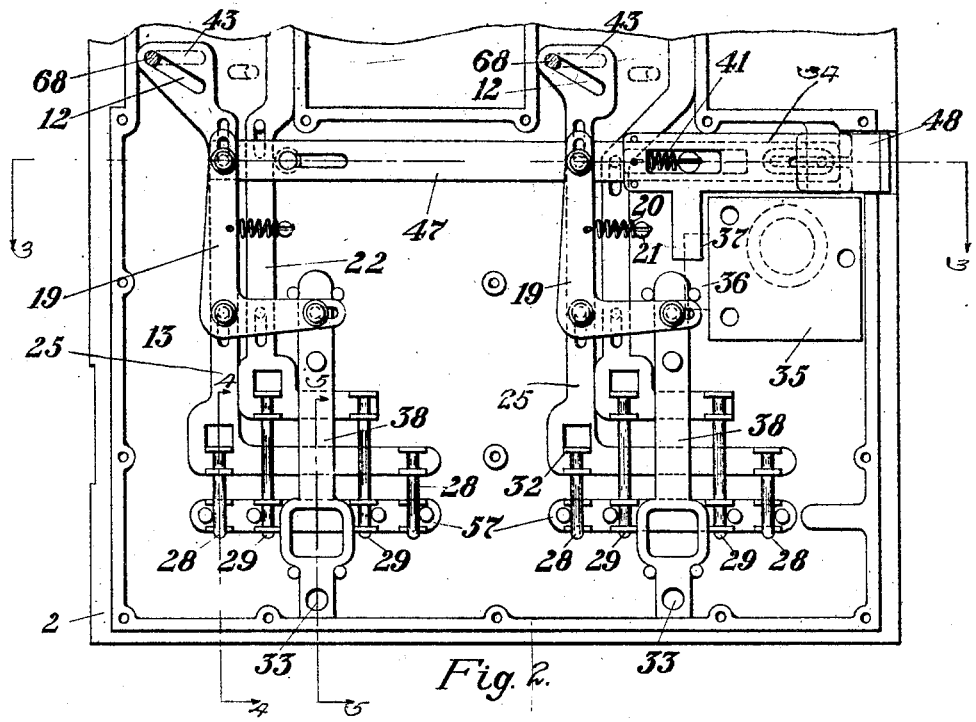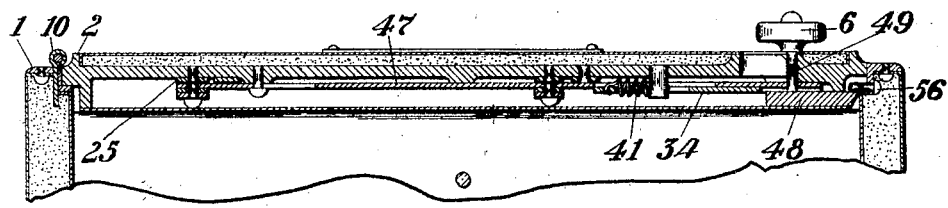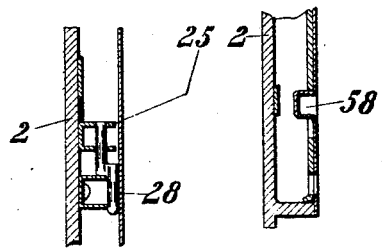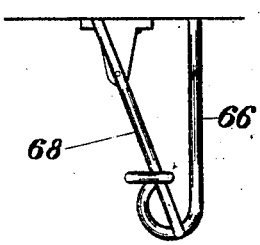

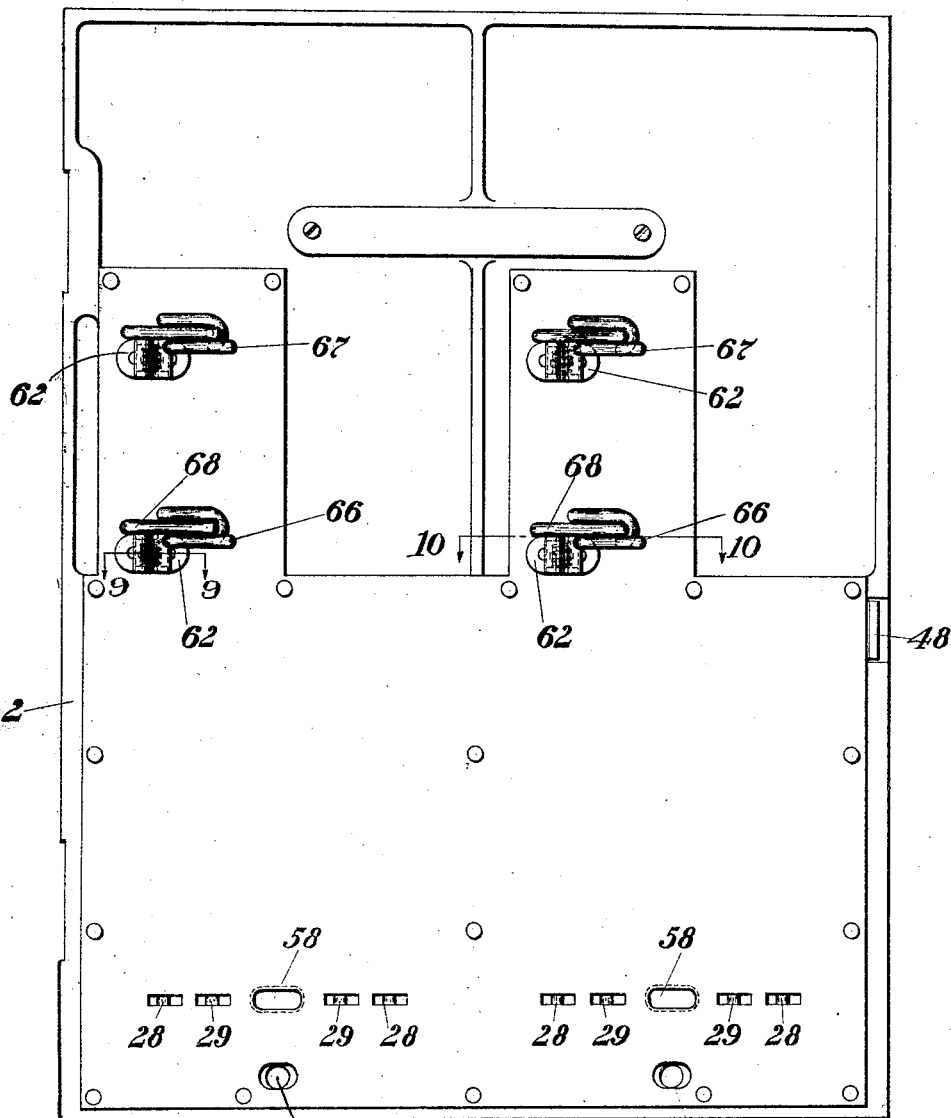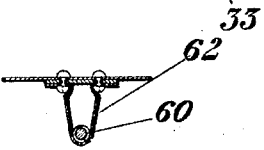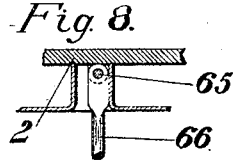

July 7, 1925.  
T. A. JENKINS  
1,545,143  
AUTOMATIC MILK RECEIVER  
Filed July 6, 1921  5 Sheets-Sheet 4
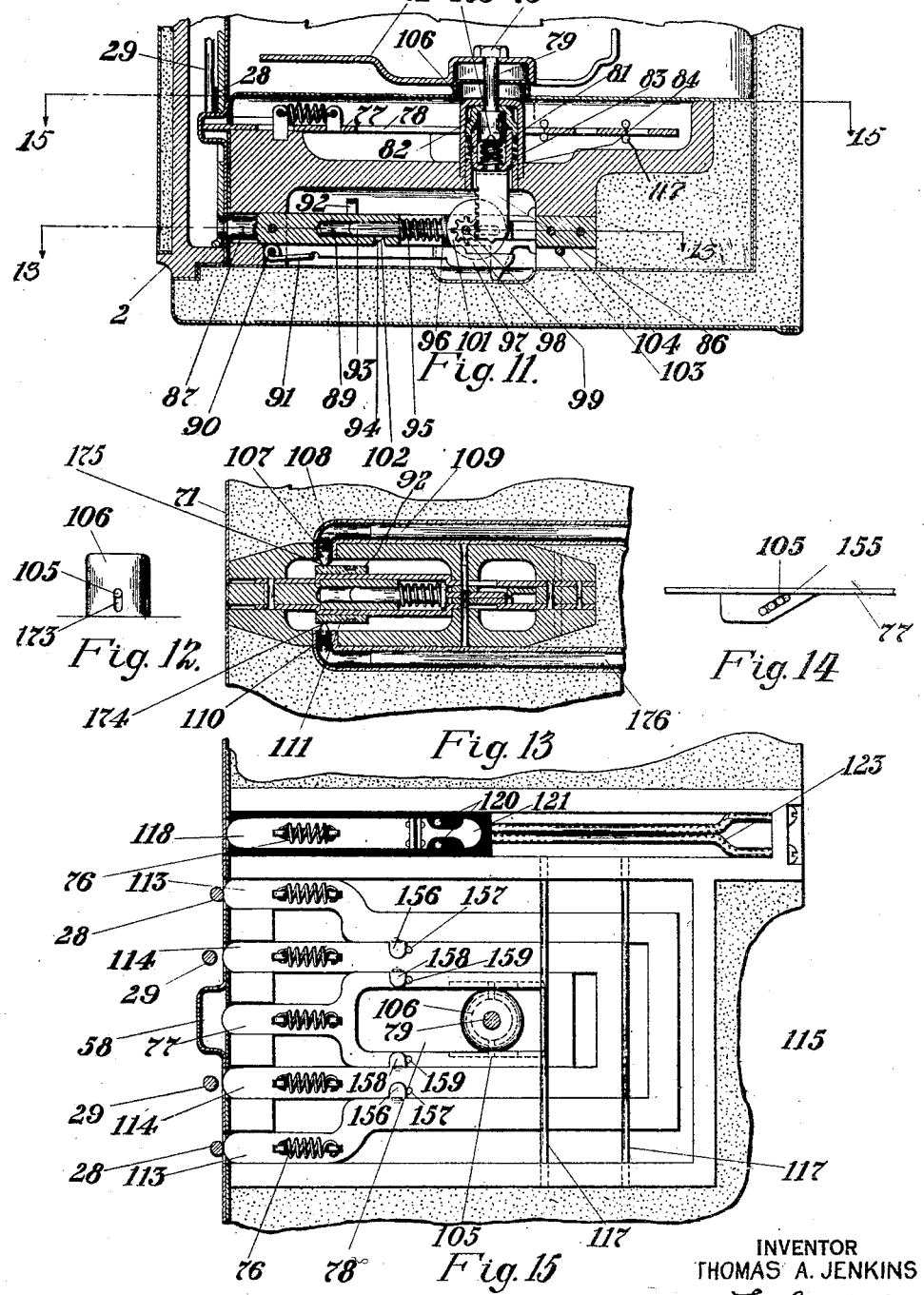
INVENTOR  
THOMAS A. JENKINS  
BY Fetherstonhaugh & Co.  
ATTORNEY July 7, 1925.

T. A. JENKINS

AUTOMATIC MILK RECEIVER

Filed July 6, 1921

INVENTOR
THOMAS A. JENKINS

BY
ATTORNEY

Patented July 7, 1925.

1,545,143

UNITED STATES PATENT OFFICE.

THOMAS A. JENKINS, OF JERSEY CITY, NEW JERSEY.

AUTOMATIC MILK RECEIVER.

Application filed July 6, 1921. Serial No. 482,833.

*To all whom it may concern:*

Be it known that I, THOMAS A. JENKINS, a citizen of the United States, and residing in Jersey City, county of Hudson, State of New Jersey, have invented certain new and useful Improvements in Automatic Milk Receivers, of which the following is a complete specification, reference being had to the drawings, which form a part of this specification.

This invention relates to milk cabinets of the type designed to be locked after the introduction of a filled milk container, against the entrance of unauthorized persons.

The principal features characterizing this invention are means controllable by the weights of different sizes of filled milk containers, so that the locking means may be operated by a container of any size or weight except an empty container. The means embodies a novel mechanism designed to be operated by a filled milk container of maximum weight, a compensating means being provided to add apparent weight to any container of a lesser size or weight than the maximum container for which the mechanism is designed. Other novel features will be apparent as the nature of the invention is more clearly understood.

Reference is now made to the drawings for a detailed description of my invention, in which—

Figure 2 is a fragmentary view in rear elevation showing the locking mechanism of the door, with the rear panel of the door removed.

Figure 3 is a view in section taken on the line 3—3 of Figure 2.

Figure 4 is a detail view in section taken on the line 4—4 of Figure 2.

Figure 5 is a detail view in section taken on the line 5—5 of Figure 2.

Figure 6 is a plan view of the container engaging elements.

Figure 7 is a view in plan of a guide plate.

Figure 8 is a view in rear elevation of the door with the rear panel in place.

Figure 9 is a detail view in section taken on the line 9—9 of Figure 8.

Figure 10 is a detail view in section taken on the line 10—10 of Figure 8.

Figure 11 is a detail vertical section taken through the lower part of the cabinet.

Figure 12 is an elevation of a cup showing a pin and vertical slot.

Figure 13 is a transverse section taken on the line 13—13 of Figure 11.

Figure 14 is a view in elevation of a weight controlled sliding plate with angular slot and pin.

Figure 15 is a view in tranverse section taken on the line 15—15 of Figure 11 of a portion of the bottom of the cabinet showing the weight control sliding plates and electrical announcing door opening switch.

Figure 1:
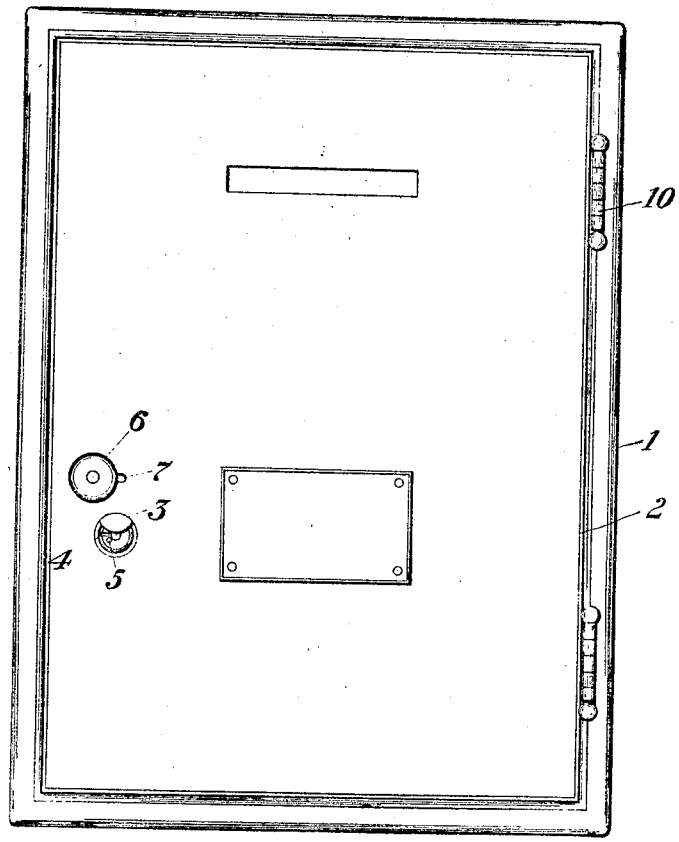
Figure 1 is a front view or elevation of one design of the proposed cabinet container.
Figure 16:
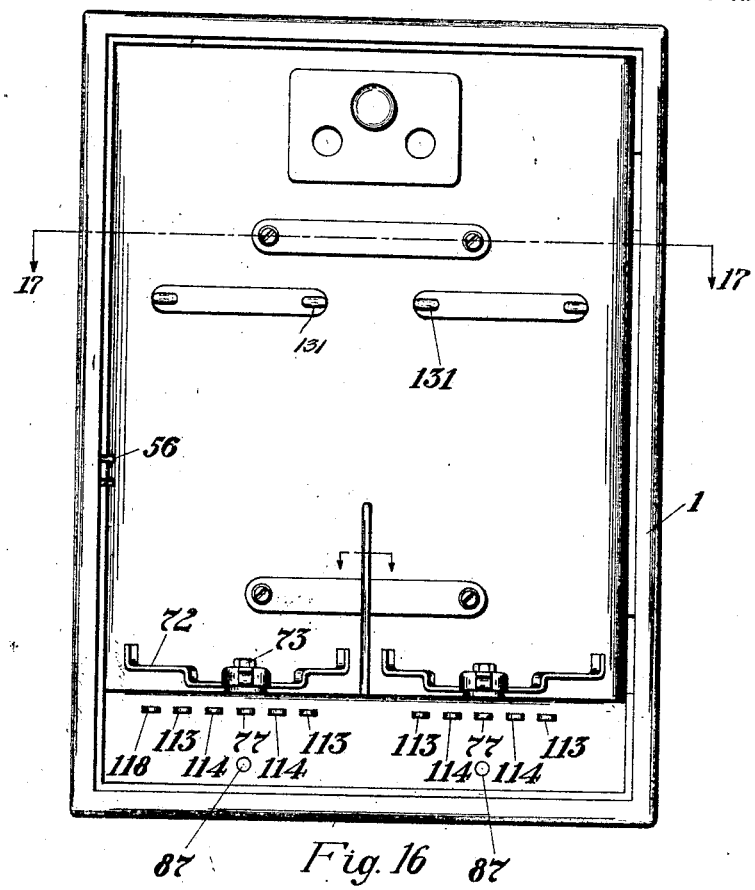
Figure 16 is an interior elevation of the cabinet with the door removed.

Proceeding to a detailed description of the drawings 1 indicates a cabinet of any desired design but consisting preferably of inner and outer walls leaving a space which is filled with a heat insulating compound. The door is indicated generally at 2 but will be described in detail later. A lock indicated at 35 in Figure 4 is secured to the inner side of the door at its free edge. This lock is of the type having a rotating barrel and for the purpose of my invention I provide a plate shown at 3 in Figure 1 and in detail in Figure 7. A pin 5 is extended from the barrel. The slot for the key is indicated at 4, and it will be noted that when the key is inserted in said slot it may be turned until the pin 5 strikes the plate 3. The key may not now be withdrawn until it is turned back to inserting position.

A knob 6 is provided having a stem which extends through a slot 7 so as to be capable of horizontal movement. Hinges 10 are provided for mounting the door for swinging movement.

Referring now to Figures 11 to 15 inclusive, 72 indicates one of a pair of milk container supports each consisting of diverging arms. Each support is carried upon a vertically movable bolt 79 guided within a casing 106. The lower end of the bolt operates in a cup member 84 formed upon the upper end of a vertically movable rack bar 86, a spring 81 being interposed between the rack bar and said bolt. A sleeve 82 surrounds the bolt and is normally urged upward by means of a spring 83. Pins 105 extend from the bolt and operate in vertical slots 173 formed in the side walls of the casing 106, said pins also being anchored to the sleeve 82. The rack bar 86 is in mesh with a pinion 98 carried by a shaft 99 to which is fixed a cam 101. The cam bears against a head 96 of a rod 93 which operates in a channel 89 of a locking bolt 87. A lever 97 is pivoted at 90 for vertical movement, is urged upward by a spring 91 and carries a tooth 102 which normally enters an opening 94 in the bolt 87 for the purpose of retaining the latter in retracted position against the influence of a spring 95 which surround the rod 93 and is interposed between the head 96 and the inner end of the locking bolt.

Associated with each milk container support is a series of slides shown in Figure 15, a pair being indicated at 113 and are joined at their inner ends so as to operate in unison. A second pair of slides 114 are located within the first mentioned slides, and a slide 77 is located centrally and is provided with central openings 78 which receives the casing 106. The slides may be supported in any manner, as between rods 117 as shown. The slides are urged in an outward direction by means of springs 76 which are anchored at one end to their corresponding slide and at their opposite ends to stationary supports. Each slide 113 carries an ear 156 which may strike pins 157 extending from the slides 114. The slides 114 likewise carry ears 158 which may strike pins 159 extending from the central slide 77 so that the central slide or any inner slide may be moved independently of the others; whereas the outer slides may not be moved without carrying the inner slides with them. The central slide 77 carries a pair of downwardly extending flanges 75 which are provided with angularly formed slots 155 into which the ends of the aforesaid pins 105 extend as shown in Figure 14.

Referring now to a description of the mechanism carried by the door attention is directed to Figures 2 to 10 inclusive; referring particularly to Figure 8 which shows a rear elevation of the door. There are provided two pair of container engaging elements upon the door so that a pair will be located directly above each container support when the door is closed. The elements of each pair are arranged in superposed relation. Each lower element consists of an arm 66 pivoted at 65 for swinging movement in a horizontal plane. The free end of each arm is provided with a hooked portion to engage the end of a lever 68 which is pivoted upon a pin 60 carried by a bracket 62. The pivoted end of said lever extends into the interior of the door and enters an inclined slot 12 formed in the upper end of a vertically movable slide 25 forming part of a mechanism of which two sets are mounted on the door, one set for each pair of container engaging elements. The inner ends of the levers 68 are also guided in horizontal slots 43 so that movement along said slots will cause the slides to elevate. Each slide 25 carries a pair of pins 28 which cooperate with the slides 11B in a manner shown in Figure 15. The slides 25 cooperate with the lowermost ones of the container engaging elements, and in a similar manner the upper ones are caused to operate slides 22 which are similar to slides 25. Each of said slides 22 carry a pair of pins 29 which cooperate with the aforesaid slides 114 in a manner shown in Figure 15.

Referring to the locking mechanism shown in Figures 2 and 3 there is provided a horizontal bar 47 mounted for longitudinal movement and having pivoted connection with one end of each of a pair of bell cranks 19, the other arms of which are pivoted to the upper ends of slides 38 which are provided at their lower ends with openings 33 for the purpose of receiving the locking bolts 87 described above and shown in Figure 11. A locking bolt 48 is mounted at the free edge and inner side of the door upon a horizontal sliding plate 34 provided with a downward extension 37 designed to be engaged by a bolt 36 of the lock 35 described above. The slide 34 carrying the bolt 38 is urged into locking position by a spring 41. When moving the door to closed position the bolt 48, having an inclined edge, will move inward and snap over a pin 56 mounted in the door jamb. The bolt may be retracted by the knob 6 which is moved to the right until its stem 49 engages the end of a slot formed in the plate 34, whereupon the latter is carried with it against the tension of the spring 41, that is, provided the parts are not set to prevent movement of the bar 47, as will occur when the mechanism is locked in a manner to be described.

In the operation of the device refer to Figures 11 to 15. A full container of milk of the largest size for which the machine is adapted, we will assume, is rested upon one of the supports 72. Such a container, we will assume, is also of a maximum height. The door is now closed, the result of which will be that the container is engaged by the arms 66 and 67 of both the upper and lower container engaging elements. In the manner described the levers 68 will be moved laterally and pins 28 and 29 of the slides 25 and 22 will be raised so as to avoid the slides 113 and 114. The slide 77 will be projected so as to be engaged by the bottom of a socket 58 formed in the door. The weight of the container will have the effect to depress the rack bar 86 and cause the cam 101 to rotate, moving the rod 93 forward against the tension of the spring 95. The tension of the several springs are balanced so that the rack bar will come to a stop before engaging the lever 97. The act of closing the door will cause the slide 77 to move inward and the pins 105 riding in the inclined slots 155 will give added depression to the rack bar sufficient to cause the same to engage the lever 97 causing the tooth 102 to leave its opening 94 and thus releasing the bolt 87 and permitting the latter to enter the opening 33 of the corresponding slide 38 shown in Figure 2. It will now be apparent that the door is locked since the horizontal bar 47 cannot be moved by means of the knob 6 owing to the connection of said bar 47 through the bell cranks 19 and slide 38 the latter being held by the bolt 87 which effectively precludes such movement as long as said locking bolt 87 is seated in the opening 33. The door may, however, be unlocked by the householder by means of a key inserted in the slot 4 of the lock 35 by projecting the bolt 36 into engagement with the extention 37 causing the slide 34 to be retracted and carrying the locking bolt 48 with it.

Assume now that a container of a lesser capacity is placed upon the support 72. Such a container will be slightly shorter in height than the maximum weight container and hence will be engaged only by the lowermost one of the pair of container engaging elements the effect of which will be to raise the slide 25 carry the pins 28 with it leaving the pins 29 depressed. When the door is closed the pins 29 will engage the slides 114 causing the latter, together with the slide 77 to move to the right. Due to the location of the pins 29 the slides 114 are moved through a greater distance than that traversed by the slide 77 in the example above given. This is for the purpose of compensating for the difference in weight between the maximum container and the one under discussion in this example, which will not depress the rack bar 86 to a distance as great as that produced by the largest container. Owing to the greater distance traversed by the slides 114 the pins 105 will be moved through the requisite distance required to lower the rack bar sufficiently to engage the lever 97.

Assume now that a very small container is placed within the support which is insufficient in height to reach the lowermost container engaging element. As a consequence the slide 25 will be unaffected and the pins 28 will remain depressed when the door is closed. Said pins 28 will engage the slides 113 and owing to the location of the pins, said pins will cause the slides to traverse a distance even greater than that traversed by the slides 114, such increased movement acting through the pins 105 upon the inclined slots 155 will cause the rack bar 86 to lower sufficiently to trip the lever 97 as before. The operation of the parts are so adjusted with reference to the sizes and weights of filled and empty milk containers that an empty container will not operate or lock the cabinet even if the container engaging elements 66 or 67 are engaged, because there is insufficient weight to depress the rack bar to the proper distance even with the added movement caused by the operation of the slides 113 or 114.

Figure 17:
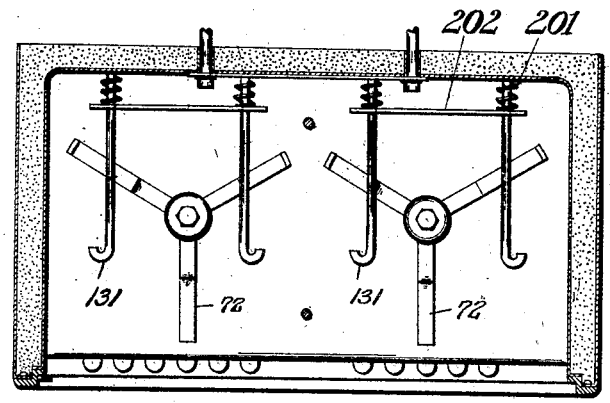
Figure 17 is a view in horizontal section taken on the line 17—17 of Figure 16.

In order that the containers may be maintained upright within the cabinet I provide upon the back wall thereof as shown in Figure 17 a pair of arms 131 above each container support between which arms the containers are guided and held. Cross bars 201 are slidably mounted on the guides 131 and urged outward by the springs 201 and acting as steps against which the containers rest.

A circuit making arrangement may be embodied in the locking bolt structure 87 as shown in Figure 13 in which the locking bolt is provided with a band 111 of insulating material in which a strip 92 of metal is embedded. A pair of spring pressed contacts 174 and 175 rest against the bands and are connected by leads 176 to an annunciator located in the house. When the bolt is thrown the metallic strip 92 bridges the contacts 174 and 175 completing a circuit to indicate to the householder that a filled container has been placed in the cabinet.

Another arrangement shown in Figure 17 may be provided and consists of a slide 118 having a contact head 121. Should the door be opened by an unauthorized person the slide 118 will be moved outward by the spring 76 until the head 121 engages two contact 120 thus completing a circuit through the leads 123 leading to a bell or other signal in the house.

I claim:

1. In a commodity cabinet, having a closure, means operable by a filled container of maximum weight and height to lock the closure subsequent to the introduction thereof, and means controllable by the height of containers of lesser weight to add apparent weight thereto which, added to the weight of such lesser container will equal that of the maximum container so as to actuate the locking means.

2. In a commodity cabinet having a closure, a yieldable support for a container, a locking means for the closure operable by said support, and means controllable by the height of the container to trip said locking means.

3. In a commodity cabinet, having a closure, means operable by the weight of a full sized filled container to lock said closure, a series of superposed container engaging elements individually engageable by containers of lesser heights, and means operable by said elements to lock the closure when containers of lesser weights are introduced.

Signed at New York, in the county and State of New York, this 10 day of May, 1921.

THOMAS A. JENKINS. [L. S.]